United States Patent
Mostapha et al.

(10) Patent No.: US 12,367,621 B2
(45) Date of Patent: Jul. 22, 2025

(54) ITERATIVE HIERARCHAL NETWORK FOR REGULATING MEDICAL IMAGE RECONSTRUCTION

(71) Applicant: Siemens Healthineers AG, Forchheim (DE)

(72) Inventors: Mahmoud Mostapha, Princeton, NJ (US); Mariappan S. Nadar, Plainsboro, NJ (US); Simon Arberet, Princeton, NJ (US)

(73) Assignee: Siemens Healthineers AG, Forchheim (DE)

( * ) Notice: Subject to any disclaimer, the term of this patent is extended or adjusted under 35 U.S.C. 154(b) by 470 days.

(21) Appl. No.: 17/814,849

(22) Filed: Jul. 26, 2022

(65) Prior Publication Data
US 2024/0037817 A1 Feb. 1, 2024

(51) Int. Cl.
*G06T 11/00* (2006.01)
(52) U.S. Cl.
CPC ....... *G06T 11/008* (2013.01); *G06T 2211/424* (2013.01)

(58) Field of Classification Search
None
See application file for complete search history.

(56) References Cited

U.S. PATENT DOCUMENTS

2022/0114771 A1* 4/2022 Arberet .................... G06N 3/08
2022/0165002 A1* 5/2022 Mostapha ............. G06T 11/006

OTHER PUBLICATIONS

Mo, Hongcheng, et al. "Frequency Attention Network: Blind Noise Removal for Real Images." Proceedings of the Asian Conference on Computer Vision. 2020.

* cited by examiner

*Primary Examiner* — Thomas D Lee (57) ABSTRACT

For reconstruction in medical imaging, such as reconstruction in MR imaging, an iterative, hierarchal network for regularization may decrease computational complexity. To further maintain computational complexity while improving robustness, auxiliary information is used in the regularization and corresponding reconstruction. The auxiliary information is in put to the machine-learned network.

20 Claims, 7 Drawing Sheets

ITERATIVE HIERARCHAL NETWORK FOR REGULATING MEDICAL IMAGE RECONSTRUCTION

FIELD

This disclosure relates to medical image reconstruction, such as reconstruction in magnetic resonance (MR) imaging.

BACKGROUND

Medical imaging, such as magnetic resonance (MR), computed tomography (CT), positron emission tomography (PET), or single photon emission computed tomography (SPECT), use reconstruction to estimate an image or real-space object from measurements. These scans may be time consuming. For example, numerous methods have been proposed to accelerate the MR scan. One acceleration method is the under-sampling reconstruction technique (i.e., MR parallel imaging with compressed sensing (CS)), where fewer samples are acquired in the MRI data space (k-space), and prior knowledge is used to restore the images in reconstruction. MR results obtained using compressed sensing reconstruction tend to show unfolding artifacts. An image regularizer is used in reconstruction to reduce these aliasing artifacts, but the regularizer adds computational burden.

Deep learning (DL) techniques based on unfolding (unrolled) iterative reconstruction algorithms with learnable regularization improve the speed and the reconstruction quality compared to CS. Some DL-based image reconstruction methods are based on unrolled iterative algorithms where a data-consistency step alternates with a regularization network. In order to obtain good results, multiple unrolled iterations of reconstruction are performed. Computational time and memory requirements are directly proportional to the number of unrolled iterations. Deep learning models need to be fast and memory-efficient while also robust to variations in MRI intensities and contrasts originating from using different scanned organs, acquisition parameters, and image resolutions. Current MRI reconstruction schemes typically utilize image regularization deep learning networks in the form of an encoding-decoding structure such as different U-net architectures. Decreasing and increasing the resolution of the feature maps is effective for learning from heterogeneous datasets, but U-net architectures increase the overall size of the feature maps, resulting in decreasing the receptive field and increasing the computational complexity.

Designing robust deep learning image regularization networks is critical in constructing high-quality MRI from subsampled multi-coil data acquired with a wide range of varying MRI acquisition protocols and scanner models. Such networks would avoid MR reconstructions with degraded image quality and reduced clinical value. The encoding-decoding structure (e.g., different U-net architectures) is trained on large datasets that cover the expected MRI variability at test time. However, in practice, learning from such large datasets requires deep learning networks with enormous capacity, which increases the training time and increases their computational complexity.

SUMMARY

By way of introduction, the preferred embodiments described below include methods, systems, instructions, and computer readable media for reconstruction in medical imaging, such as reconstruction in MR imaging. An iterative, hierarchal network for regularization may decrease computational complexity. To further maintain computational complexity while improving robustness, the auxiliary information is input to the machine-learned network. The auxiliary information is used in the regularization and corresponding reconstruction.

In a first aspect, a method is provided for reconstruction of a medical image in a medical imaging system. The medical imaging system scans a patient. The scanning results in measurements. An auxiliary scan and/or map is obtained. An image processor reconstructs the medical image from the measurements. The reconstruction includes a regularizer implemented with a machine-learned network including iterative hierarchal convolutional networks. The reconstruction includes concatenating a first image derived from the measurements with the auxiliary scan and/or map for input to the machine-learned network. The medical image is displayed.

In one embodiment, the auxiliary scan and/or map is based on an additional scan in addition to the scanning. For example, the auxiliary scan and/or map is a reference scan different from the scanning for the measurements being reconstructed. In other embodiments, the auxiliary scan and/or map is generated from the scanning. For example, the auxiliary scan and/or map is a noise map. As a further example, the noise map is computed from a noise level, gfactor map, and bias-filled correction map. Other auxiliary information may be used, such as a gfactor map or a derived noise map.

According to some embodiments, the auxiliary scan and/or map is used within the reconstructing.

Various types of medical imaging and reconstruction may be used, such as scanning with a magnetic resonance (MR) scanner where the measurements are k-space measurements.

Various types of or arrangements for reconstruction may be used. In one embodiment, an unrolled iterative reconstruction is used where each of multiple reconstructions in the unrolled iterative reconstruction includes regularization. A regularizer provides the regularization for at least one of the multiple reconstructions. In another embodiment, each of the iterative convolutional networks includes both downsampling and up-sampling. The iterative hierarchal convolutional networks have different weights. The machine-learned network further includes a memory network with convolution layers. The memory network is applied separately to the outputs of the iterative hierarchal convolutional networks. The machine-learned network further includes an enhancement block of one or more convolutional layers. The enhancement block receives a concatenation of outputs of the memory network and outputs the medical image as regularized.

In one embodiment, the machine-learned network includes a feature extraction block of one or more convolution layers. The feature extraction block is prior to the iterative hierarchal convolutional networks and has channels for receiving the concatenated first image with the auxiliary scan and/or map as the input.

In a second aspect, a method is provided for reconstruction of a magnetic resonance (MR) image in a MR imaging system. The MR imaging system scans a patient, resulting in k-space measurements. An auxiliary scan and/or map is obtained. An image processor reconstructs the MR image from the k-space measurements. The reconstruction is implemented, at least in part, with a machine-learned network, which includes input of the auxiliary scan and/or map in the reconstruction. The MR image is displayed.

In one embodiment, the auxiliary scan and/or map is an external reference scan or a noise map.

As another embodiment, the input is formed as a concatenation of the auxiliary scan and/or map and a complex image output by a consistency stage. The machine-learned network is part of a regularization stage.

In another embodiment, the machine-learned network includes iterative hierarchal convolutional networks.

In a third aspect, a system is provided for reconstruction in medical imaging. A medical scanner is configured to scan a region of a patient, providing scan data. An image processor is configured to reconstruct a representation of the region from the scan data. The image processor is configured to reconstruct by application of a machine-learned model in a regularization stage. The machine-learned model is configured to receive an input image from a data consistency stage and auxiliary information. A display is configured to display a medical image of the region from the reconstructed representation.

In an embodiment, a concatenation layer of the machine-learned model in the regularization stage is provided. The concatenation layer is configured to combine the auxiliary information and the input image.

In another embodiment, the auxiliary information is an external reference scan and/or a noise map.

As yet another embodiment, the machine-learned model is a down-sampling and up-sampling first block having multiple down-sampling and up-sampling second blocks.

The present invention is defined by the following claims, and nothing in this section should be taken as a limitation on those claims. Further aspects and advantages of the invention are discussed below in conjunction with the preferred embodiments and may be later claimed independently or in combination.

DETAILED DESCRIPTION

An image regularization network with a hierarchical design leverages the availability of auxiliary information (e.g., scans and/or maps) to improve the robustness of deep learning reconstruction models while maintaining reasonable computational efficiency. The computational efficiency may allow their use in practice. Rather than performing a post-process on a reconstructed object or image with the auxiliary information, the auxiliary information is included within or as part of the reconstruction, such as being used by the regularization stage in one or more iterations of the reconstruction optimization.

The iterative reconstruction framework utilizes external information, providing improved robustness or generalizability. For example, robust deep learning-based MR reconstruction models are trained while maintaining their computational efficiency (e.g., not needing for layers or nested U-nets) due to the use of auxiliary information. In contrast to approaches that incorporate such auxiliary scan information in post-processing tasks, the use in the reconstruction framework allows for a more universal solution, such as training a model for reconstruction that may be used for different types of scans, different scan settings for a given type, and/or different types of scanners. Emerging MRI technologies and/or applications, where collecting large datasets is challenging, may benefit from the model using auxiliary information in the reconstruction as less training data may be needed. For example, gfactor maps or derived noise maps are incorporated as auxiliary information to support cheaper, low-field (e.g., 0.5 T) MRI scanners with limited signal-to-noise-ratio (SNR).

Figure 6:
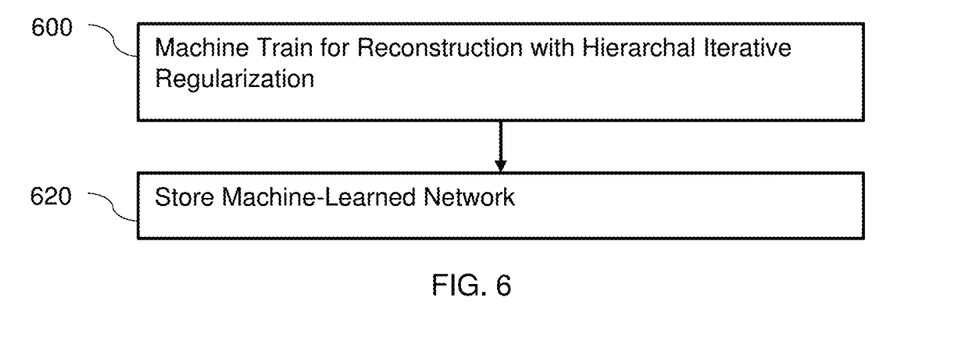
FIG. 6 is a flow chart diagram of one embodiment of a method for machine training for regularizing in reconstruction.
Figure 7:
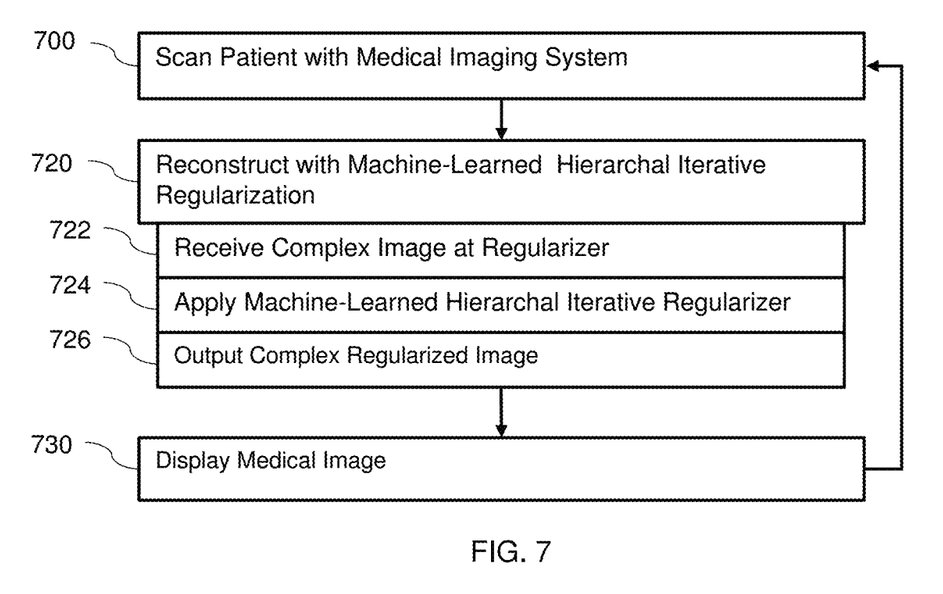
FIG. 7 is a flow chart diagram of one embodiment of a method for reconstruction using a machine-learned network for regularization.
Figure 8:
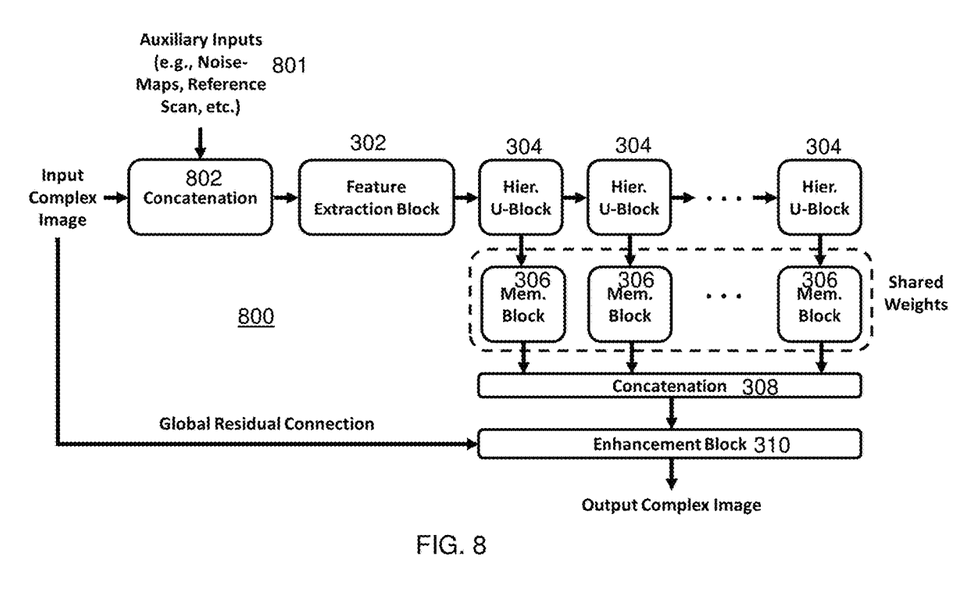
FIG. 8 is a block diagram of one embodiment of an iterative network for regulating in a given iteration of reconstruction, using auxiliary information.
Figure 9:
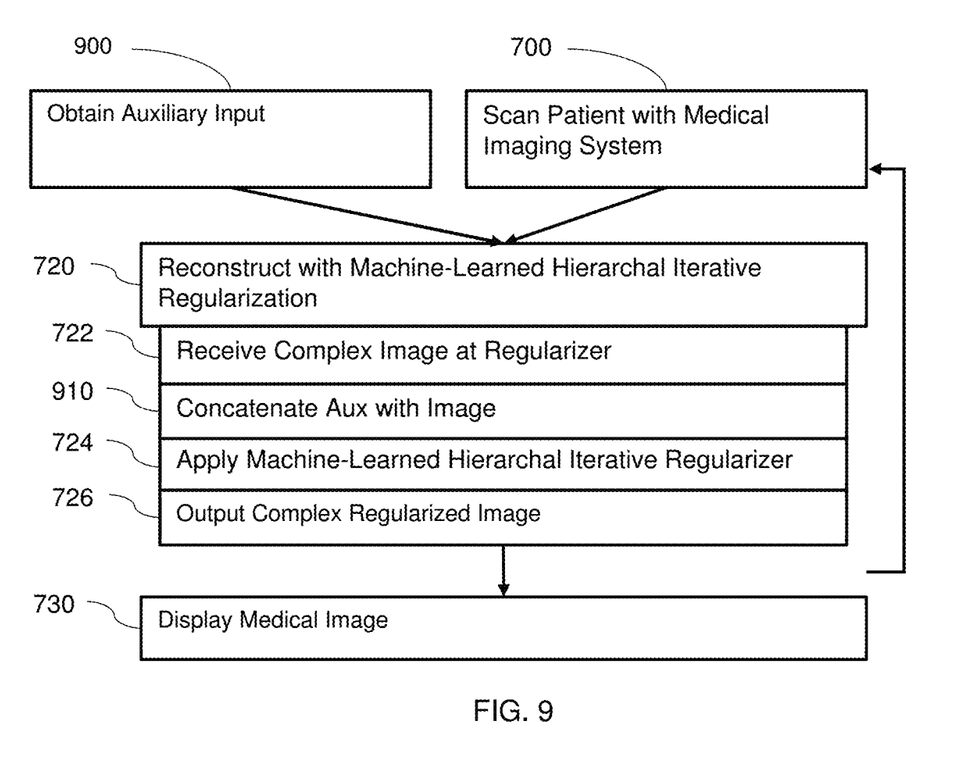
FIG. 9 is a flow chart diagram of one embodiment of a method for reconstruction using a machine-learned network for regularization using auxiliary information.

FIGS. 1-7 describe various embodiments of reconstruction using a machine-learned model. For example, the regularization stage in an unrolled, iterative reconstruction includes or is implemented by a machine-learned network with a hierarchal design. See U.S. Published Application No. 2022/0165002, which is incorporated herein by reference. FIGS. 8 and 9 introduce the use of auxiliary information in the regularization stage for at least one iteration. In other embodiments, the auxiliary information is used for the gradient update stage or other stage within or as part of the reconstruction before final output of the reconstructed object, region or image.

FIGS. 1-7 are first described below. FIGS. 8 and 9 are then described. Acts, steps, layers, network architecture, or other blocks of FIGS. 8 and 9 described as part of FIGS. 1-7 are not repeated in the discussion of FIGS. 8 and 9.

For FIGS. 1-7, an image regularization network has a hierarchical design that iteratively down-samples the input image feature maps followed by an up-sampling procedure. This deep iterative hierarchical network (DIHN) has improved memory efficiency, such as using 20-30% less GPU memory, compared to conventional U-Net architectures in the regularizer. The improved memory efficiency results, at least in part, from the DIHN performing most of the computations on a coarser scale due to the hierarchy. Moving the computation to a coarser scale does not limit analysis at the finest scale due to the hierarchical design, allowing DIHN to regulate reconstruction models when learning from heterogeneous MRI datasets. This more efficient regularization in reconstruction is capable of processing a wide range of imaging variability with a single model without requiring explicit meta-data inputs. As a result, images from different imaging applications (i.e., different settings) and/or types of imaging may be used to train the model, providing a larger training dataset. The one trained model may then be used for any of the various imaging applications and/or types of imaging without requiring multiple application or type-specific models.

Figure 1:
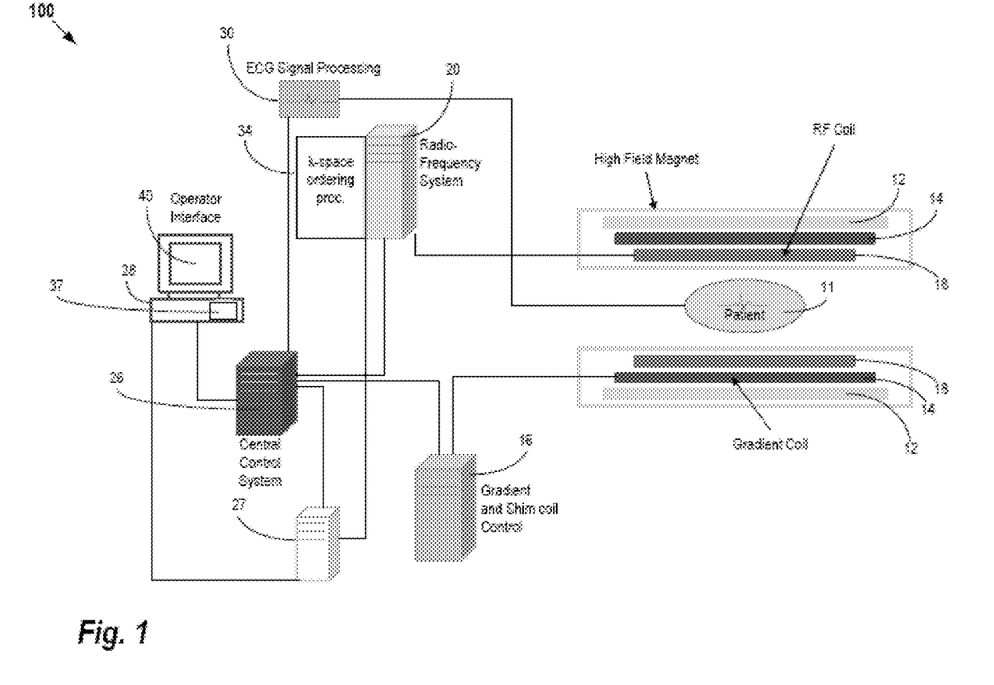
FIG. 1 is a block diagram of an embodiment of an MR system for medical imaging using an iterative and/or hierarchal network for regulating.

FIG. 1 shows one embodiment of a system for reconstruction in medical imaging. An image regularization network has a hierarchical design that iteratively down-samples the input image feature maps followed by an up-sampling procedure.

The example used herein is in a magnetic resonance context (i.e., a magnetic resonance scanner), but the iterative and/or hierarchal regularizer network may be used in reconstruction for CT, PET, SPECT, or other medical imaging. The iterative and/or hierarchal regularizer network is used for reconstruction into an object or image domain from projections or measurements in another domain. In the discussion below, the MR context is used.

The system uses a machine-learned model in reconstruction. The machine-learned model is formed from one or more networks and/or another machine-learned architecture. For example, the machine-learned model is a deep learned neural network. The machine-learned model is used for regularization of reconstruction. Image or object domain data is input, and image or object domain data with less artifact is output. The machine-learned model assists in compressed, parallel sensing, or other MR imaging for more rapid scanning and less computational burden in reconstruction. The remaining portions or stages of the reconstruction (e.g., Fourier transform and gradients in iterative optimization) are performed using reconstruction algorithms and/or other machine-learned networks.

The system is implemented by an MR scanner or system, a computer based on data obtained by MR scanning, a server, or another processor. MR scanning system 100 is only exemplary, and a variety of MR scanning systems can be used to collect the MR data. In the embodiment of FIG. 1, the system is or includes the MR scanner or MR system 100. The MR scanner 100 is configured to scan a patient. The scan provides scan data in a scan domain. The system 100 scans a patient to provide k-space measurements (measurements in the frequency domain). In the system 100, magnetic coils 12 create a static base magnetic field in the body of patient 11 to be positioned on a table and imaged. Within the magnet system are gradient coils 14 for producing position dependent magnetic field gradients superimposed on the static magnetic field. Gradient coils 14, in response to gradient signals supplied thereto by a gradient and shim coil control module 16, produce position dependent and shimmed magnetic field gradients in three orthogonal directions and generate magnetic field pulse sequences. The shimmed gradients compensate for inhomogeneity and variability in an MR imaging device magnetic field resulting from patient anatomical variation and other sources. The magnetic field gradients include a slice-selection gradient magnetic field, a phase-encoding gradient magnetic field, and a readout gradient magnetic field that are applied to patient 11.

RF (radio frequency) module 20 provides RF pulse signals to RF coil 18, which in response produces magnetic field pulses that rotate the spins of the protons in the imaged body of the patient 11 by ninety degrees, by one hundred and eighty degrees for so-called "spin echo" imaging, or by angles less than or equal to 90 degrees for so-called "gradient echo" imaging. Gradient and shim coil control module 16 in conjunction with RF module 20, as directed by central control unit 26, control slice-selection, phase-encoding, readout gradient magnetic fields, radio frequency transmission, and magnetic resonance signal detection, to acquire magnetic resonance signals representing planar slices of patient 11.

In response to applied RF pulse signals, the RF coil 18 receives MR signals, i.e., signals from the excited protons within the body as they return to an equilibrium position established by the static and gradient magnetic fields. The MR signals are detected and processed by a detector within RF module 20 and k-space component processor unit 34 to provide an MR dataset to an image data processor for processing into an image (i.e., for reconstruction in the object domain from the k-space data in the scan domain). In some embodiments, the image data processor is located in or is the central control unit 26. In other embodiments, such as the one depicted in FIG. 1, the image data processor is located in a separate unit 27. ECG synchronization signal generator 30 provides ECG signals used for pulse sequence and imaging synchronization. A two- or three-dimensional k-space storage array of individual data elements in k-space component processor unit 34 stores corresponding individual frequency components forming an MR dataset. The k-space array of individual data elements has a designated center, and individual data elements individually have a radius to the designated center.

A magnetic field generator (comprising coils 12, 14 and 18) generates a magnetic field for use in acquiring multiple individual frequency components corresponding to individual data elements in the storage array. The individual frequency components are successively acquired using a Cartesian acquisition strategy as the multiple individual frequency components are sequentially acquired during acquisition of an MR dataset representing an MR image. A storage processor in the k-space component processor unit 34 stores individual frequency components acquired using the magnetic field in corresponding individual data elements in the array. The row and/or column of corresponding individual data elements alternately increases and decreases as multiple sequential individual frequency components are acquired. The magnetic field acquires individual frequency components in an order corresponding to a sequence of substantially adjacent individual data elements in the array, and magnetic field gradient change between successively acquired frequency components is substantially minimized. The central control processor 26 is programmed to sample the MR signals according to a predetermined sampling pattern. Any MR scan sequence may be used, such as for T1, T2, or other MR parameter. In one embodiment, a compressive sensing scan sequence is used.

The central control unit 26 also uses information stored in an internal database to process the detected MR signals in a coordinated manner to generate high quality images of a selected slice(s) of the body (e.g., using the image data processor) and adjusts other parameters of system 100. The stored information includes a predetermined pulse sequence and a magnetic field gradient and strength data as well as data indicating timing, orientation and spatial volume of gradient magnetic fields to be applied in imaging.

The central control unit 26 (i.e., controller) and/or processor 27 is an image processor that reconstructs a representation of the patient from the k-space data. The image processor is a general processor, digital signal processor, three-dimensional data processor, graphics processing unit, application specific integrated circuit, field programmable gate array, artificial intelligence processor, digital circuit, analog circuit, combinations thereof, or another now known or later developed device for reconstruction. The image processor is a single device, a plurality of devices, or a network. For more than one device, parallel or sequential division of processing may be used. Different devices making up the image processor may perform different functions, such as reconstructing by one device and volume rendering by another device. In one embodiment, the image processor is a control processor or other processor of the MR scanner 100. Other image processors of the MR scanner 100 or external to the MR scanner 100 may be used.

The image processor is configured by software, firmware, or hardware to reconstruct. The image processor operates pursuant to stored instructions on a non-transitory medium to perform various acts described herein.

The image processor is configured to reconstruct a representation in an object domain. The object domain is an image space and corresponds to the spatial distribution of the patient. A planar area or volume representation is reconstructed as an image representing the patient. For example, pixels values representing tissue in an area or voxel values representing tissue distributed in a volume are generated.

The representation in the object domain is reconstructed from the scan data in the scan domain. The scan data is a set or frame of k-space data from a scan of the patient. The k-space measurements resulting from the scan sequence are transformed from the frequency domain to the spatial domain in reconstruction. In general, reconstruction is an iterative process, such as a minimization problem. This minimization can be expressed as:

$$x = \underset{x}{\operatorname{argmin}} \|Ax - y\|_2^2 + \lambda \|Tx\|_1 \quad (1)$$

where x is the target image to be reconstructed, and y is the raw k-space data. A is the MRI model to connect the image to MRI-space (k-space), which can involve a combination of an under-sampling matrix U, a Fourier transform F, and sensitivity maps S. T represents a sparsifying (shrinkage) transform. A is a regularization parameter. The first term of the right side of equation 1 represents the image (2D or 3D spatial distribution or representation) fit to the acquired data, and the second term of the right side is a term added for denoising by reduction of artifacts (e.g., aliasing) due to under sampling. The l1 norm is used to enforce sparsity in the transform domain. $\|Ax-y\|_2^2$ is the l2 norm of the variation of the under-sampled k-space data. Generally, the lp norm is $$\sqrt[p]{\Sigma |x|^p}.$$

In some embodiments, the operator T is a wavelet transform. In other embodiments, the operator T is a finite difference operator in the case of Total Variation regularization.

Figure 2:
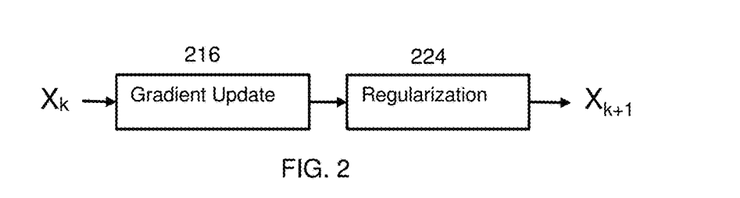
FIG. 2 shows an embodiment of iteration in reconstruction.

The reconstruction is iterative, such as repeating the reconstruction operation to minimize. In some embodiments, an unrolled iterative reconstruction is provided as a network or model of iteration sequences. As shown in FIG. 2, a given iteration either in an unrolled network or through a repetition of the reconstruction operations includes a gradient update 216 (e.g., first term of equation 1) and regularization 224 (e.g., second term of equation 1). The gradient update 216 compares the current image object with the scan data (e.g., k-space measurements, y). This comparison uses a system transform to relate the measurements to the image object. Any gradient or comparison relating the image object to the measurements may be used. As shown in FIGS. 2, the regularization 224 operates on the output of the gradient update 216. The regularizer is, at least in part, a machine-learned network. A machine-learned model is applied in the regularization stage. In one embodiment, deep learning is used to train a convolutional neural network (CNN) as the regularizer. Regularization may not be included in all the iterations. Input bias field correction and/or extrapolation for momentum may be provided as part of the reconstruction. Other filtering and/or operations for reconstruction and/or post-reconstruction may be provided.

The regularizer 224 is implemented as a machine-learned model, such as a machine-learned network. Machine learning is an offline training phase where the goal is to identify an optimal set of values of learnable parameters of the model that can be applied to many different inputs (i.e., image domain data after gradient calculation in the optimization or minimization of the reconstruction). These machine-learned parameters can subsequently be used during clinical operation to rapidly regularize the reconstruction of images. Once learned, the machine-learned model is used in an online processing phase in which images from the gradient update 216 is input and the regularized image for the patients are output based on the model values learned during the training phase.

During application to one or more different patients and corresponding different scan data, the same learned weights or values for the regularization 224 are used. The model and values for the learnable parameters are not changed from one patient to the next, at least over a given time (e.g., weeks, months, or years) or given number of uses (e.g., tens or hundreds). These fixed values and corresponding fixed model are applied sequentially and/or by different processors to scan data for different patients. The model may be updated, such as retrained, or replaced but does not learn new values as part of application for a given patient.

The model has an architecture. This structure defines the learnable variables and the relationships between the variables. In one embodiment for the regularization 224, a neural network is used, but other networks or machine learning models may be used. In one embodiment, a convolutional neural network (CNN) is used. Any number of layers and nodes within layers may be used. A DenseNet, U-Net, encoder-decoder, Deep Iterative Down-Up CNN, and/or another network may be used. Some of the network may include dense blocks (i.e., multiple layers in sequence outputting to the next layer as well as the final layer in the dense block). Any know known or later developed neural network may be used.

The image processor is configured to reconstruct with the machine-learned model (e.g., CNN) trained as a regularizer in the reconstruction. The iterative reconstruction may be unrolled where a given number of iterations of gradient update 216 and regularization 224 is used. The same CNN is used for each iteration. Alternatively, a different CNN is provided for each iteration, whether a different architecture or same architecture but with different values for one or more of the learnable parameters of the CNN. Different CNNs are trained for different iterations in the reconstruction. Each CNN may have the same architecture, but each is separately learned so that different values of the learnable parameters may be provided for different iterations of the reconstruction.

The machine-learned model forming the regularizer 224 is hierarchal and/or iterative. As hierarchal, the model includes down and up-sampling where additional networks of down and up-sampling are provided as layers or blocks within the down and up-sampling (i.e., nested U-blocks). For example, a given top level architecture includes down and up-sampling, and a block after an initial down-sampling and before a final up-sampling includes a lower-level architecture that also includes both down and up-sampling.

Multiple blocks at the same or different levels or scales of the top-level architecture may include down and up-sampling.

As iterative, the model includes multiple networks in sequence. An unrolled architecture is provided where the same or different network architecture is provided for each of multiple iterations feeding forward through the iterations to output a final regularized image object for the given reconstruction iteration. Where the reconstruction is unrolled, the iteration in the regularizer is an iteration within the one of the reconstruction iterations. Each or some of the reconstruction iterations may include iterative regularization.

The model for regularization may be both iterative and hierarchal. For example, an unrolled sequence of CNNs are provided for regularization. Each of the CNNs include nested or hierarchal down and up-sampling blocks implemented as CNNs, resulting in down and up-sampling of features at lower resolutions within the CNN that is also down and up-sampling at a top level.

Figure 3:
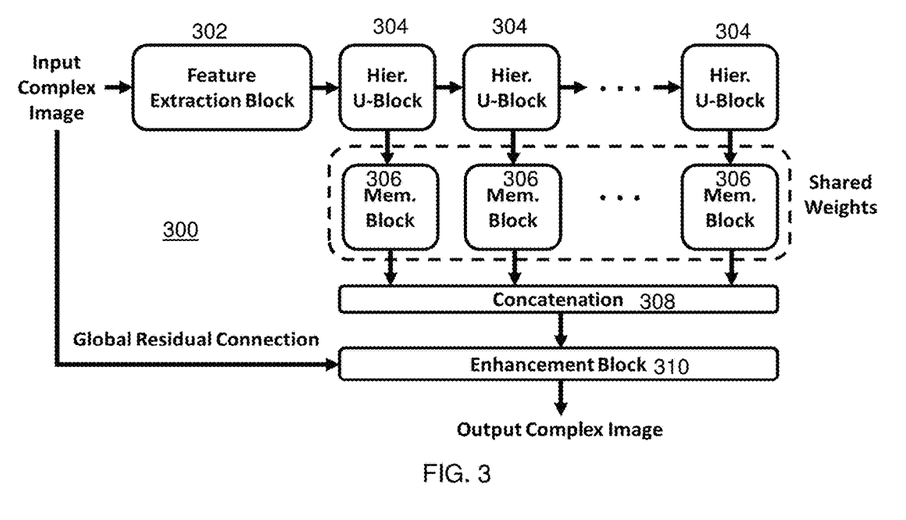
FIG. 3 is a block diagram of one embodiment of an iterative network for regulating in a given iteration of reconstruction.
Figure 4:
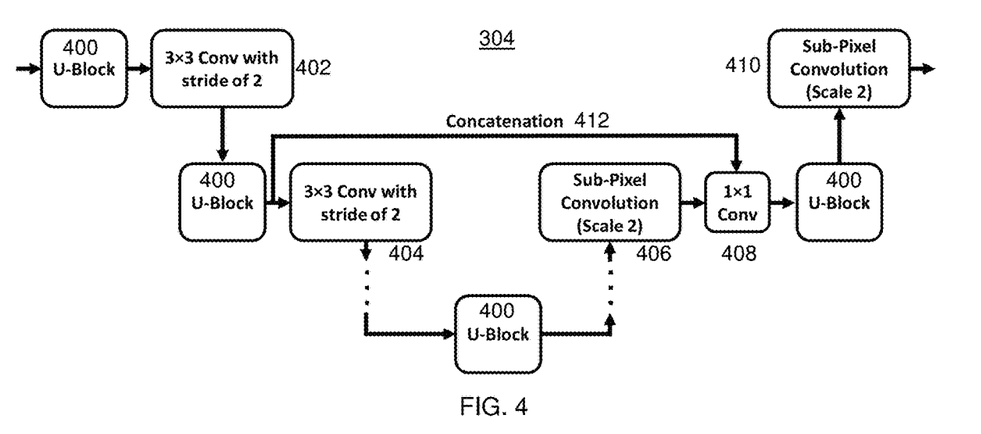
FIG. 4 is a block diagram of one embodiment of a hierarchal U-block network for regulating.
Figure 5:
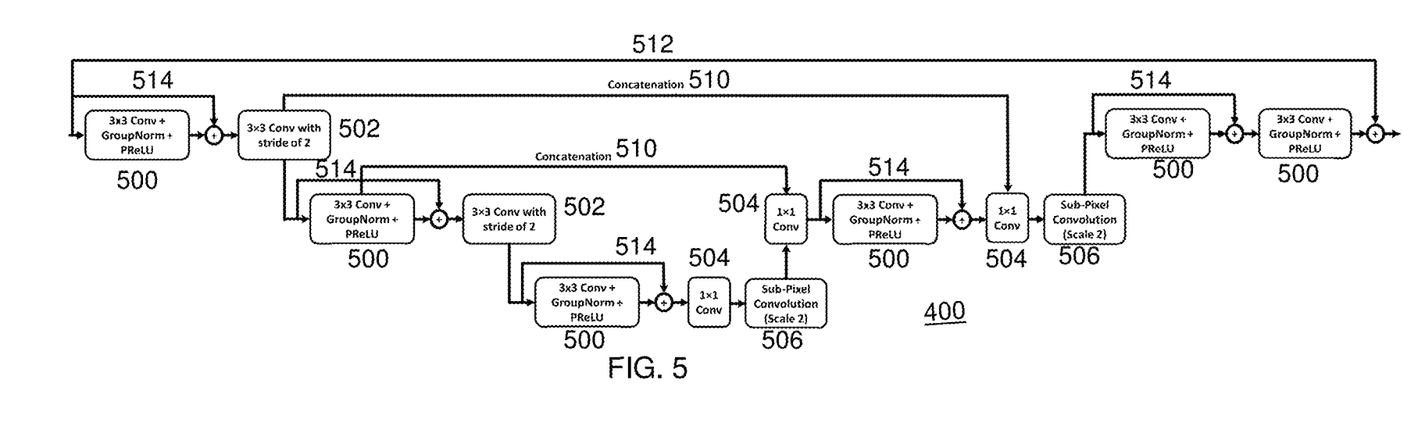
FIG. 5 is a block diagram of one embodiment of a U-block architecture used in a hierarchal U-block network.

FIGS. 3-5 show an example CNN architecture for an iterative hierarchal model or network. The reconstruction includes the regularizer model 300, implemented at least in part as a machine-trained model. The input is an image from the gradient update 216. In this example, the image is in the object domain and represented as complex data (i.e., real and imaginary). In other embodiments, such as using Dixon scan for MR, the input data is real, not complex. The regularizer model 300 receives the data (e.g., complex image or object data) output by the gradient update 216.

The model 300 includes an optional feature extraction block 302. The feature extraction block 302 receives the input image and outputs to the iterative portion (i.e., blocks 304) of the model 300. The feature extraction block 302 is a neural network, such as a CNN implementing a one or more convolution layers to increase the number of feature maps. For example, two input channels are increased to thirty-two output channels. As another example, the input complex image is first passed through the initial feature extraction block 302 where twice the number of input feature maps are extracted with half the image resolution achieved through convolutions with stride 2. The feature extraction block 302 down samples without up-sampling (e.g., by stride 2). No or greater down-sampling (e.g., stride 4) may be used. The down-sampling reduces the amount of data as compared to no down-sampling. Dilated convolution may be used to maintain the depth and computational complexity of the network while increasing the receptive field. Dilated convolution may not be used to avoid gridding artifact as features are sparsely downsampled.

The model 300 includes iterative regularization. A series of hierarchal or non-hierarchal U-blocks 304 are provided. Hierarchal is used in the example embodiment of FIG. 3. Each hierarchal U-block 304 is a convolution neural network. The initial hierarchal U-block 304 receives the complex image, features output by the feature extraction block 302, and/or a combination thereof as input. The initial hierarchal U-block 304 outputs to the next hierarchal U-block 304 in the unrolled series and outputs to a memory block 306. Each successive hierarchal U-block 304 receives input from the previous hierarchal U-block 304 and outputs to the next hierarchal U-block 304 and the memory block 306. The last hierarchal U-block 304 of the series outputs to the memory block 306. Any number of hierarchal U-blocks 304 may be provided, such as two, three, four, eight, twelve, or sixteen.

In training, each hierarchal U-block 304 is a separate network with the same architecture. As a result, the same learnable parameter may have a different learned value for one hierarchal U-block 304 as compared to any others of the hierarchal U-blocks 304. In other embodiments, the architecture also varies so that different architectures are provided for different ones of the hierarchal U-blocks 304.

The hierarchal U-blocks 304 are hierarchal. In one embodiment, each of the iterative U-blocks 304 (e.g., CNNs) are hierarchal. One or more other blocks and/or iterative U-blocks 304, which are not hierarchal, may be provided.

FIGS. 4 and 5 show an example hierarchal U-block 304 implemented as a CNN. The hierarchal U-block 304 includes nested down-sampling and up-sampling. For example, FIG. 4 shows the hierarchal U-block 304 as including U-blocks 400, each of which also includes down-sampling followed by up-sampling. The result is a hierarchy of down and up-sampling at one or more resolution levels within down and up-sampling. The interior down and up-sampling blocks operate on reduced resolution data, so are less computationally and memory expensive.

The hierarchal U-block 304 of at least one iteration of regularization includes U-blocks 400. These U-blocks 400 are provided at different levels of the down and up-sampling of the hierarchal U-block 304. In the example architecture of FIG. 4, a U-block 400 receives the input. A 3×3 or other sized convolution layer 402 with a stride of 2 or other stride downs samples the output of the initial U-block 400. The convolution layer 402 outputs to another U-block 400, which outputs to another 3×3 or other sized convolution layer 404 with a stride of 2 or other stride and outputs to a concatenation 412. The convolution layer 404 down samples, and outputs to one or more additional layers or levels of U-blocks 400 and convolution layers for down sampling. The down sampling continues until the lowest level or resolution U-block 400 is reached at the bottleneck of the hierarchal U-block 304. Similarly, corresponding up-sampling provided by sub-pixel convolution layers 406, 410 with intervening U-blocks 400 is provided. A U-block 400 is not provided at the output but may be. While a scale of 2 is shown, other up-sampling scales may be used.

The concatenation may be a convolution layer or other structure. The concatenation generates additional features, providing more output features than input to the concatenation. In alternative embodiments, the number of features is not increased, a skip connection without any network layers, a residual connect layer (e.g., sum), or other operation is provided. While only one concatenation 412 is shown for one level or resolution (scale), other concatenations at other levels may be provided. The concatenation 412 is parallel with the bottleneck, skipping part of the network to pass between the down sampling chain and the up-sampling chain at a same resolution.

In this machine-learned model 300 of FIG. 3, the extracted features are passed through several hierarchal U-blocks 304 of FIG. 4. The hierarchal U-blocks 304 are composed of a several U-blocks 400 interspersed with down-sampling, allowing efficient processing at a coarser scale before up-sampling the processed feature maps using subpixel convolutions 406, 410. Each U-block 400 itself includes an architecture that has down-sampling, followed by up-sampling.

FIG. 5 shows an example CNN architecture for each U-block 400. All the U-blocks 400 may have the same or different architecture. The down-sampling chain includes layers 500 with convolution (e.g., 3×3), group normalization, and PReLU activation and down sampling convolution layers 502 with any stride (e.g., 2). The up-sampling chain after the bottle neck (i.e., lowest scale) includes layers 500 as well as 1×1 convolutions 504 and sup-pixel convolutions 506 with any scale (e.g., 2).

Group normalization is used, but batch or other normalization layers may be provided instead. PReLU activation is used to provide the network with additional modeling flexibility, but ReLU, leaky ReLU, or other activation functions may be used. Sub-pixel convolutions are used for upscaling the feature maps for computational efficiency, but transposed convolutions with the desired scale may alternatively be used to additionally increase the model flexibility.

The U-block 400 includes concatenation 510 at the different scales. A global connection 512 is included, so that the input is passed to the output. Local connections 514 connect inputs to outputs for the convolution layers 500. These local and global connections 512, 514 are skip connections passing the inputs to be summed with the outputs of the convolution layers 500 and the entire U-block 400, respectively. The local and global residual connections 512, 514 enhance information flow while maintaining efficient memory usage, such as compared to dense connections.

Other architectures for the U-block 400 may be used. Other hierarchal architectures for the hierarchal U-blocks 304 may be used. Other iterative architectures of the machine-learned model 300 for regularization may be used.

Returning to FIG. 3, the machine-learned model includes the memory block 306. The memory block 306 is formed from convolution layers, such as being a CNN. The memory block 306 does not but may include down-sampling and/or up-sampling. In one embodiment, the memory block 306 includes the architecture of the U-block 400 without the convolution layers 502 and without the convolution layers 506. Other architectures may be used.

FIG. 3 shows separate memory blocks 306 with shared weights. The same memory block 306 is applied separately to the outputs of the different hierarchal U-blocks 304. Alternatively, separate memory blocks 306 are trained for the separate or iterative hierarchal U-blocks 304. The memory block 306 is provided to combine the outputs of the hierarchical U-blocks 304. The memory block 306 may extract features from the output of the hierarchal U-blocks 304 and/or from different scales within the hierarchal U-blocks 304. The memory block 306 processes the extracted feature maps at different levels.

The machine-learned model 300 includes a concatenation 308. The concatenation 308 is a memory storing a collection of the features output by the memory block 306. The memory block 306 concatenates the memory block outputs before passing the features to the final enhancement block 310. The concatenation 308 is formed from neural network layers in other embodiments, such as providing further convolution layers.

The machine-learned model 300 includes an enhancement block 310. The enhancement block 310 is one or more convolution layers to refine the output. In one embodiment, 1×1 convolution is used to fuse the concatenated representations. Where the feature extraction block 302 includes down-sampling without a corresponding up-sampling, the enhancement block 310 includes a sub-pixel convolution layer to generate the final complex output image at the resolution or scale of the input to the machine-learned model 300. A global residual connection may input the input image to the enhancement block 310. The enhancement block 310 receives a concatenation 308 of outputs of the memory block 306 and the input image and outputs the medical image as regularized.

The output medical image is formed from complex values. Real values may be output in other embodiments.

The output complex image is the final reconstructed image if the regularization is the final iteration of the reconstruction. The output image represents the patient (i.e., a reconstructed representation). Otherwise, the output complex image is the image generated for a given reconstruction iteration. This image is then used in the next reconstruction iteration for the gradient update.

The image processor may be configured to generate an MR image from the reconstructed representation. Where the representation is of an area, the values of the representation may be mapped to display values (e.g., scalar values to display color values) and/or formatted (e.g., interpolated to a display pixel grid). Alternatively, the output representation is of display values in the display format. Where the representation is of a volume, the image processor performs volume or surface rendering to render a two-dimensional image from the voxels of the volume. This two-dimensional image may be mapped and/or formatted for display as an MR image. Any MR image generation may be used so that the image represents the measured MR response from the patient. The image represents a region of the patient.

Generated images of the reconstructed representation for a given patient are presented on a display 40 of the operator interface. The computer 28 of the operator interface includes a graphical user interface (GUI) enabling user interaction with central control unit 26 and enables user modification of magnetic resonance imaging signals in substantially real time. The display processor 37 processes the magnetic resonance signals to provide image representative data for display on display 40, for example.

The display 40 is a CRT, LCD, plasma, projector, printer, or other display device. The display 40 is configured by loading an image to a display plane or buffer. The display 40 is configured to display the reconstructed MR image of a region of the patient.

FIG. 6 is a flow chart diagram of one embodiment of a method for machine training for reconstruction in medical imaging, such as training a neural network to regularize in reconstruction from signals collected by an MR scanner. Once trained, the machine-learned model (e.g., regularization) may be used with the same learned values in reconstruction of representations for any number of patients from a respective number of sets of MR scan data for the patients.

The method is implemented by a computer, such as a personal computer, workstation, and/or server. Other computers may be configured to perform the acts of FIG. 6. The MR scanner 100 or central control unit 26 may implement the method. In one embodiment, the computer and a database are used to machine train and store the samples and the resulting final trained model. The stored model is then distributed to one or more MR scanners 100 for application using the model as fixed (i.e., the learned values of the variables are not changed for reconstructions for a given patient and/or for different patients).

The method is performed in the order shown (i.e., top to bottom or numerical). Additional, different, or fewer acts may be provided. For example, instead of or in addition to storing in act 620, the machine-learned model is applied to previously unseen scan data for a patient in a reconstruction as shown in FIG. 7. As another example, acts for gathering and/or accessing training data are performed.

In act 600, a computer (e.g., image processor) machine trains a model for reconstruction, such as training for a neural network for regularization. To machine train, training data is gathered or accessed. The training data includes many sets of data, such as image or object domain data. Tens, hundreds, or thousands of sample image data from reconstruction are acquired, such as from scans of patients, scans of phantoms, simulation of scanning, and/or by image processing to create further samples. Many examples that may result from different scan settings, patient anatomy, scanner characteristics, or other variance that results in different samples in scanning are used. In one embodiment, the samples are for MR compressed sensing, such as image domain data resulting from under sampled k-space data. The samples may be for many different applications and/or types of imaging, resulting in a larger set of training data. The training uses multiple samples of input sets, such as object domain data representing patients after Fourier transform and/or gradient calculation. The samples are used in deep learning to determine the values of the learnable variables (e.g., values for convolution kernels) that produce outputs with minimized cost function and/or maximized likelihood of being a good representation (i.e., discriminator cannot tell the difference) across the variance of the different samples.

The training data may and/or may not include ground truth information. The desired representation or image resulting from a given sample is and/or is not provided. For example, the image data without or with reduced artifacts to be output by regularization is provided as ground truth with some or all of the samples of input image data.

Deep learning is used to train the model. The training learns both the features of the input data and the conversion of those features to the desired output (i.e., denoised or regularized image domain data). Backpropagation, RMSprop, ADAM, or another optimization is used in learning the values of the learnable parameters of the regularization 224 (i.e., the CNN). Where the training is supervised, the differences (e.g., L1, L2, or mean square error) between the estimated output and the ground truth output are minimized. Where a discriminator is used in training, the ground truth is not needed. Instead, the discriminator determines whether the output is real or estimated as an objective function for feedback in the optimization. The characteristic is one that likely distinguishes between good and bad output by examining the output rather than by comparison to a known output for that sample. Joint training (e.g., semi-supervised) may be used.

Any hierarchal and/or iterative architecture or layer structure for machine learning to regularize in reconstruction may be used. The architecture defines the structure, learnable parameters, and relationships between parameters. In one embodiment, a convolutional or another neural network is used for the regularizer. Deep machine training is performed. Any number of hidden layers may be provided between the input layer and output layer.

In one embodiment, the architecture includes a sequence of iterations or unrolled iteration networks. A neural network with an unrolled arrangement of U-blocks in a sequence is machine trained as a regularizer for the reconstruction in the medical imaging. The architecture may include U-blocks with down-sampling and up-sampling, such as implemented as a CNN, fully connected network, or another network arrangement. In additional or alternative embodiments, the architecture includes one or more hierarchal U-networks, such as one or more (e.g., each) of the U-blocks for iteration including hierarchal U-networks. The hierarchal U-networks have blocks at different scales with down and up-sampling, providing down and up-sampling in at least one block that is part of a down-sampling chain and/or providing down and up-sampling in at least one block that is part of an up-sampling chain. The iterative and/or hierarchal architecture is machine trained, such as machine training with each of the U-blocks in the sequence having a hierarchy of U-networks. The U-networks may have local and/or global residual connections for data consistency.

In one embodiment, the machine-learned model 300 of FIGS. 3-5 is the architecture being trained. The CNN is machine trained. The feature extraction block 302, hierarchal U-blocks 304, memory block 306, and enhancement block 310 form a convolution network, which is machine trained. The hierarchal U-blocks 304 are trained as a sequence or unrolled configuration. The memory block 306 is trained to have the same weights or one memory block 306 is trained for application to outputs of the iterative hierarchal U-blocks 304. The memory block 306 is trained to receive outputs from the hierarchal U-blocks 304 of the sequence and separately process the outputs with shared weights.

Once trained, the neural networks are applied in reconstruction of a representation or image of a patient from a scan of that patient. For example, the machine-learned networks for regularization are used with reconstruction algorithms (e.g., gradient descent and extrapolation) during unrolled iterative reconstruction.

In one embodiment, the unrolled reconstruction is used. The unrolled reconstruction includes a set number of iterations, but another optimization stop criterion may be used. Each iteration may be handled differently. For example, a separate neural network or machine-learned model 300 is trained for each reconstruction iteration. The same or different architecture of the network is used for the different iterations. For example, different networks of the same architecture but with one or more different learned values of the learnable parameters are provided for different ones of the reconstruction iterations. In training, each network and weight or weights are trained simultaneously or together across iterations. By reconstructing as part of training, the simultaneous training for the different iterations is provided.

In another embodiment, the reconstruction or part of the reconstruction is an iterative optimization (i.e., not unrolled). The reconstruction includes an optimization. The machine-learned model (e.g., learned regularization network) is used within or as part of the reconstruction optimization, such as for denoising data.

After training, the machine-learned model or models are represented as a matrix, filter kernels, and/or architecture with the learned values. The learned convolution kernels, weights, connections, and/or layers of the neural network or networks are provided.

In act 620 of FIG. 6, the computer or image processor stores the machine-learned model resulting from the machine learning. For example, the regularizer network or networks, including the iteration order or sequence, are stored. The matrix or other parameterization of the machine-learned networks are saved in memory. The machine-learned model may be stored locally or transferred over a network or by moving the memory to other computers, workstations, and/or MR scanners.

The model resulting from the machine training using the plurality of the samples is stored. This stored model has fixed weights or values of learnable parameters determined based on the machine training. These weights or values are not altered by patient-to-patient or over multiple uses for different medical scans. The weights or values are fixed, at least over a number of uses and/or patients. The same weights or values are used for different sets of scan data corresponding to different patients. The same values or weights may be used by different medical scanners. The fixed machine-learned model or models are to be applied without needing to train as part of the application. Retraining or updated training may be provided.

Once trained, the machine-learned model (e.g., learned CNN) is used for reconstruction of a spatial representation from input k-space measurements for a patient. For example, the machine-learned model is applied for regularization in the reconstruction.

FIG. 7 is a flow chart diagram of one embodiment of a method for reconstruction of a medical image in a medical imaging system, such as reconstruction of a MR image in an MR system. A machine-learned model as trained is applied for regularization in the reconstruction of an image for a patient. The machine-learned model was previously trained and includes a hierarchal and/or iterative network.

The application is part of scanning for patient diagnosis. The scan is performed as one of different imaging applications for different anatomy and/or disease. Due to versatility of the hierarchal and/or iterative network in regularization, the same machine-learned model may be applied to different imaging applications, such as for different anatomy and/or disease. The machine-learned network is applied independent of the different imaging applications. The machine-learned network may have been trained on reconstructions or regularization for the different imaging applications.

The method is performed by the system of FIG. 1 or another system. The medical scanner scans the patient. An image processor reconstructs the image using the machine-trained model, and a display displays the medical image. Other components may be used, such as a remote server or a workstation performing the reconstruction and/or display.

The method is performed in the order shown or other orders. Additional, different, or fewer acts may be provided. For example, a preset, default, or user input setting are used to configure the scanning prior art act 700. As another example, the image is stored in a memory (e.g., computerized patient medical record) or transmitted over a computer network instead of or in addition to the display of act 730. In another example, one or more of acts 722, 724, and/or 726 are not performed as these acts represent one embodiment or example of performing act 720.

In act 700, the medical system scans a patient. For example, an MR scanner or another MR system scans the patient with an MR compressed (e.g., under sampling), parallel, compressed parallel, or another MR sequence. The amount of under sampling is based on the settings, such as the acceleration. Based on the configuration of the MR scanner, a pulse sequence is created. The pulse sequence is transmitted from coils into the patient. The resulting responses are measured by receiving radio frequency signals at the same or different coils. The scanning results in k-space measurements as the scan data.

In another example, a computed tomography scanner scans a patient by transmitting x-rays from different angles through the patient. The scanning results in detected projections for a given patent as the scan data.

In act 720, an image processor reconstructs a representation of the patient from the scan data. For MR reconstruction, the k-space data is Fourier transformed into scalar values representing different spatial locations, such as spatial locations representing a plane through or volume of a region in the patient. Scalar pixel or voxel values are reconstructed as the MR image. The spatial distribution of measurements in object or image space is formed. This spatial distribution represents the patient.

The reconstruction is performed, at least in part, using a deep machine-learned model, such as a neural network trained with deep machine learning, for regularization. The machine-learned model is previously trained, and then used in reconstruction as trained. Fixed values of learned parameters are used for application. In application of the already trained network, the reconstruction process is followed. The machine-learned model is used in the reconstruction. For example, regularization is performed in every or only some iterations using the deep learned network (e.g., CNN of FIGS. 3-5). In response to the input for a given patient, a patient specific image is reconstructed. The machine-learned model outputs the image as pixels, voxels, and/or a display formatted image in response to the input. The learned values and network architecture, with any algorithms (e.g., extrapolation and gradient update) determine the output from the input.

The output of the machine-learned network is a two-dimensional distribution of pixels representing an area of the patient and/or a three-dimensional distribution of voxels representing a volume of the patient. The output from the last reconstruction iteration may be used as the output representation of the patient.

The machine-learned network of the machine-learned model implements a regularizer. The reconstruction is performed iteratively with gradients, a Fourier transform, and the regularizer. The regularizer receives image space information from the Fourier transform or after the gradient operation and outputs denoised image space information.

The reconstruction may be iterative. Each iteration determines an updated image object from an input image object, with the gradient operation comparing fit with the measurements. For example, an unrolled iterative reconstruction is performed. Different machine-learned networks are used for the different iterations. Some iterations may not include regularization, and at least one iteration does include a machine-learned model for regularization. For example, an initial sequence of iterations does not include regularization, and a subsequent sequence of iterations includes regularization with machine learned models. After the last iteration, the output representation by the regularizer or gradient update is provided for imaging or the medical record of the patient.

Other processing may be performed on the input k-space measurements before input. Other processing may be performed on the output representation or reconstruction, such as spatial filtering, color mapping, and/or display formatting. In one embodiment, the machine-learned network outputs voxels or scalar values for a volume spatial distribution as the medical image. Volume rendering is performed to generate a display image as a further display image. In alternative embodiments, the machine-learned network outputs the display image directly in response to the input.

Acts 722, 724, and 726 represent one embodiment of the reconstruction with the machine-learned regularizer of act 720. In the reconstruction, a regularizer for at least one reconstruction iteration is implemented with a machine-learned network. Additional, different, or fewer acts may be provided.

In act 722, a complex image output by a gradient update, Fourier transform, or other reconstruction operation is received. A computer or image processor receives the pixels, voxels, or other data in object or image space. In alternative embodiments, image data that is not complex is received.

In act 724, the image processor or computer applies a machine-learned hierarchal and/or iterative regularizer. The received complex image data is input to the input channels of the machine-learned model.

In one embodiment, the machine-learned network of FIG. 5 is applied. The machine-learned network includes a feature extraction block of one or more convolution layers. The feature extraction block is prior to the iterative convolutional networks, so forms the input channels. The complex image with real and imaginary values is input to two channel inputs.

The machine-learned network may be iterative, such as providing iterative hierarchal convolutional networks. Each of the iterative hierarchal convolutional networks may include both down-sampling and up-sampling. This unrolled network structure provides a series of CNNs, which may have different weights and the same architecture.

The machine-learned network may be hierarchal. For example, the iterative CNNs each have U-blocks at different levels of the down-sampling and the up-sampling chains, such as shown in FIG. 4. None, one, or more (e.g., at least one) concatenation connection may be provided in parallel with a bottleneck. The U-blocks themselves also include down-sampling and up-sampling layers, so that down and up-sampling is provided in one block of a down-sampling or up-sampling chain (e.g., nested). The U-blocks may include local and/or global connections.

The machine-learned network may include other structure. For example, a memory network with convolution layers is applied separately to the outputs of the iterative convolutional networks. The outputs from the memory network are concatenated and input to an enhancement block of one or more convolutional layers. The enhancement block receives a concatenation of outputs of the memory network and outputs the medical image as regularized in act 726. The output medical image may be further processed, such as further reconstruction iterations. The output medical image for the last reconstruction iteration may be further processed, such as filtering, rendering or color mapping. The output medical image may have complex values or real values.

In act 730, a display (e.g., display screen) displays the medical image, such as the MR image. The medical image, after or as part of any post processing, is formatted for display on the display. The display presents the image for viewing by the user, radiologist, physician, clinician, and/or patient. The image assists in diagnosis.

The displayed image may represent a planar region or area in the patient. Alternatively, or additionally, the displayed image is a volume or surface rendering from voxels (three-dimensional distribution) to the two-dimensional display.

The same deep machine-learned model may be used for different patients. The same or different copies of the same machine-learned model are applied for different patients, resulting in reconstruction of patient-specific representations or reconstructions using the same values or weights of the learned parameters of the model. Different patients and/or the same patient at a different time may be scanned while the same or fixed trained machine-learned regularization model is used in reconstruction the image. Other copies of the same deep machine-learned model may be used for other patients with the same or different scan settings and corresponding sampling or under sampling in k-space.

FIGS. 8 and 9 are directed to a system and method of FIGS. 3 and 7, respectively, altered to include auxiliary information in the reconstruction. FIG. 8 shows a block diagram of an embodiment of a hierarchal machine-learned model 800 used in a regularization stage of a system for reconstruction (e.g., system of FIGS. 1 and/or 2). The auxiliary information may be incorporated into other parts of the reconstruction, such as within the data consistency stage.

The image processor is configured to reconstruct a representation of the region from the scan data by application of a machine-learned model 800 in a regularization stage. The machine-learned model 800 is configured to receive an input image from a data consistency stage (gradient update 216) and auxiliary information 801. The machine-learned model 800 of FIG. 8 is used instead of the machine-learned model 300 of FIG. 3, in at least one iteration. The machine-learned model 800 of FIG. 8 includes the same structure, architecture, and/or arrangement as the model 300 of FIG. 3, but with the concatenation 802 for receiving the auxiliary input 801. Like the model 300 of FIG. 3, the model 800 of FIG. 8 includes a features extraction block 302, hierarchal U-blocks 304, memory blocks 306, concatenation 308, and enhancement block 310. The hierarchal U-blocks 304 are down-sampling and up-sampling blocks with multiple additional down-sampling and up-sampling blocks nested therein. Other embodiments discussed above for FIG. 1-7 may be used. Other machine-learned models with or without nested U-blocks (i.e., with or without hierarchal U-blocks 304, see FIGS. 4-5) may incorporate auxiliary information within the reconstruction. Other machine-learned models without U-blocks may be used.

The concatenation 802 is a layer of the model 800, such as being a layer in a neural network forming the model 800. In other embodiments, the concatenation 802 is a programmed operation performed as part of the model 800 without a corresponding neural network layer in the neural network. In either case, the concatenation 802 is part of the machine-learned model 800 in the regularization stage (e.g., regularizer or regularization 224).

The concatenation 802 is configured to combine the auxiliary information 801 and the input image. Any number of inputs may be used, such as two channels for the complex image (i.e., one channel for the real part and one for the imaginary part) with one or more channels for the auxiliary input(s) 801. For example, in addition to the input complex MR image, auxiliary scans and/or maps are incorporated through an initial concatenation layer before the initial feature extraction block 302, which allows for better model generalizability without imposing significant constraints on the needed model capacity. The concatenation 802 may be positioned after the feature extraction block 302, such as for input to one or more of the hierarchal U-blocks 304, input within one or more of the hierarchal U-blocks 304, input to or within one or more memory blocks 306, input to the concatenation 308, and/or input to or within the enhancement block 310.

The concatenation 802 combines multiple sources of information or data for input to the feature extraction block 302. The data is formatted into channels for input. Data may be joined, such as joining end-to-end sequences or arrangements of data representing different times, locations, and/or types of information. Other concatenation or combination may be used, such as combining into different channels.

The feature extraction block 302 is expanded to include inputs for both the image and the auxiliary inputs 802 as concatenated. Where the concatenation formats as combined strings, the feature extraction block 302 may include the same number of channels as in the model 300 of FIG. 3 but with additional memory, buffers, or nodes for the length of the string resulting from the combination. Where the concatenation formats into separate sets, input channels of the feature extraction block 302 are provided for each set.

The auxiliary input 801 is one or more sources of extra information (i.e., information auxiliary to the scan data and complex image generated from the scan data). The information may be clinical for the patient and/or scanner related (e.g., characteristic of the scanner, such as type of scanner, type of scan, strength, and/or settings).

In other embodiments, the auxiliary input 801 is a spatial representation. For example, the auxiliary information is an external reference scan and/or a noise map. The auxiliary information is not available with and/or from the scanning of the patient for diagnosis. An external reference scan, such as for patient positioning and/or to prepare for scanning (e.g., scout scan), is used as auxiliary information. The external reference scan is external to the scan for reconstruction. The reconstruction is of data from a different scan, but the external reference scan may provide useful information in the reconstruction. The external reference scan may be directly available in raw data for the imaging session of a given patient.

The auxiliary input 801 may be generated from available scan information. For example, one or more noise maps are computed from the noise level, gfactor map(s), and bias-filed correction map(s). The noise map is derived from various sources. Other sources of information or a scan specifically for detecting noise may be used to provide the noise map. In yet other embodiments, the auxiliary information is the gfactor map(s), noise level, and/or bias-filled correction map(s) without generating or computing a noise map therefrom. Other sources of spatial information auxiliary to the scan data being reconstructed may be used.

Only one source of auxiliary information is input. Alternatively, two or more sources of auxiliary information (e.g., external reference scan, scanner characteristic, and noise map) are input as the auxiliary input 801.

The model 800 of FIG. 8 is machine trained as discussed for FIG. 6. The auxiliary inputs are obtained for the training samples, such as from patient records and/or simulation. The auxiliary inputs and scan data for the samples of training data are used to learn values of the learnable parameters of the model 800. The resulting machine-learned model 800 is then tested or applied for a patient with unseen scan data and auxiliary inputs 801.

FIG. 9 shows one embodiment of a method for reconstruction of a medical image in a medical imaging system, such as a method for reconstruction of a magnetic resonance (MR) image in a MR imaging system. The method of FIG. 9 is similar to the method of FIG. 7 with the addition of acts 900 and 910. Additional, different, or fewer acts may be provided, such as discussed above for FIG. 7 or without act 910 where the inputs are to a different part or parts of the machine-learned model.

The acts are performed in the order shown (top to bottom) or another order. Acts 900 and 700 are performed in any order relative to each other or simultaneously. Where act 900 relies on scan data from the scanning of act 700, then act 900 is performed after the scanning of act 700. Act 910 is performed after act 722 and before act 724.

In act 700, the medical imaging system scans a patient, resulting in measurements. For example, an MR scanner scans, resulting in k-space measurements. A gradient descent or data consistency stage generates an iteration image from the measurements. Noise or artifacts are to be removed by regularization prior to the next iteration in the reconstruction.

In act 900, the image processor obtains auxiliary information, such as an auxiliary scan and/or map. The auxiliary information is obtained by loading from memory, transfer over a computer network, user input, processing by an image processor, and/or from scanning the patient. The auxiliary information may be computed or generated from available information, such as generating a noise map from the scan data (k-space measurements) from the scan of act 700 or a different scan.

In one embodiment, the auxiliary information is an auxiliary scan and/or map. For example, scan data and/or a reconstruction from an external reference scan is obtained. As another example, a noise map is generated by the scanner and/or from the measurements of the scan of act 700 or another scan of the patient. The auxiliary information may be based on an additional scan in addition to the scan of act 700, such as a scout scan or another scan external to the pulse sequence and detection used to acquire measurements reconstructed into a diagnostic image for the patient. For example, the auxiliary information is a reference scan (e.g., scan data such as k-space measurements or reconstruction therefrom) different from the scanning for the measurements being reconstructed. Alternatively, the auxiliary information is generated from, at least in part, the measurements obtained from the scanning of act 700. For example, a noise map based on the measurements is generated and used as auxiliary information. The noise map may be computed from a noise level, gfactor map, and bias-filled correction map. Other noise measurements may be used, such as any noise map derived from measurements of the scan of act 700 and/or another scan. The gfactor map, correction map, and/or noise level may be used without computing a separate noise map. Other masks (e.g., gfactor or other mask) may be used as the auxiliary information.

In act 720, the image processor reconstructs the medical or MR image from the measurements or k-space measurements. The reconstruction is implemented, at least in part, with a machine-learned network, such as an iterative hierarchal convolutional network of the model 800 of FIG. 8. For example, the reconstruction includes a regularizer implemented with the machine-learned network of iterative hierarchal convolutional networks. As a further example, the model 800 of FIG. 8 with the arrangements of FIGS. 4 and 5 is used. Each or some of the iterative convolutional networks includes both down-sampling and up-sampling. The iterative hierarchal convolutional networks have different weights. The machine-learned network further includes a memory network with convolution layers where the memory network is applied separately to the outputs of the iterative hierarchal convolutional networks. The machine-learned network further includes an enhancement block of one or more convolutional layers, where the enhancement block receives a concatenation of outputs of the memory network and outputs the medical image as regularized. In yet another embodiment, the machine-learned network is part of an unrolled iterative reconstruction where each or some of multiple reconstructions in the unrolled iterative reconstruction includes regularization. The regularizer of each iteration with regularization provides the regularization for a given one of the multiple reconstruction iterations.

For the reconstruction, the image processor receives the complex image at the regularizer in act 722. The data consistency or gradient update stage 224 outputs a complex image to be regularized.

In act 910, the image processor concatenates the complex image with the auxiliary information. The auxiliary inputs of act 900 are combined with the complex image for input to or as the beginning of the regularizer. The machine-learned network accepts input of both the auxiliary information (e.g., scan or map) and the image derived from the measurements. This concatenation for input to the machine-learned network allows the auxiliary information to be used within the reconstruction.

The feature extraction block of one embodiment includes one or more convolutional layers prior to iterative hierarchal convolutional networks. The feature extraction block of the network includes channels for receiving the concatenated image with the auxiliary scan and/or map as the input.

The input to the machine-learned network (e.g., hierarchal iterative regularizer) applies that network to the image in act 724. A complex regularized image is output in act 726 by the network in response to the input. Other iterations of the reconstruction may be performed, such as further data consistency and regularization. Once a final reconstruction is generated, the display displays the generated medical image (e.g., MR image) or an image generated from the reconstruction (e.g., a three-dimensionally rendered image).

Although the subject matter has been described in terms of exemplary embodiments, it is not limited thereto. Rather, the appended claims should be construed broadly, to include other variants and embodiments, which can be made by those skilled in the art.

What is claimed is:

1. A method for reconstruction of a medical image in a medical imaging system, the method comprising:
   scanning, by the medical imaging system, a patient, the scanning resulting in measurements;
   obtaining an auxiliary scan and/or map;
   reconstructing, by an image processor, the medical image from the measurements, the reconstructing includes a regularizer implemented with a machine-learned network comprising iterative hierarchal convolutional networks, wherein the reconstructing includes concatenating a first image derived from the measurements with the auxiliary scan and/or map for input to the machine-learned network;
   displaying the medical image.

2. The method of claim 1 wherein reconstructing comprises reconstructing with the auxiliary scan and/or map being based on an additional scan in addition to the scanning.

3. The method of claim 2 wherein reconstructing comprises reconstructing with the auxiliary scan and/or map being a reference scan different from the scanning for the measurements being reconstructed.

4. The method of claim 1 wherein reconstructing comprises reconstructing with the auxiliary scan and/or map being generated from the scanning.

5. The method of claim 4 wherein the auxiliary scan and/or map comprises a noise map.

6. The method of claim 5 further comprising computing the noise map from a noise level, gfactor map, and bias-filled correction map.

7. The method of claim 1 wherein reconstructing comprises reconstructing with the auxiliary scan and/or map being a gfactor map or a derived noise map.

8. The method of claim 1 wherein the auxiliary scan and/or map is used within the reconstructing.

9. The method of claim 1 wherein scanning comprises scanning with the medical imaging system being a magnetic resonance (MR) scanner and the measurements being k-space measurements.

10. The method of claim 1 wherein reconstructing comprises reconstructing as an unrolled iterative reconstruction where each of multiple reconstructions in the unrolled iterative reconstruction includes regularization, the regularizer providing the regularization for at least one of the multiple reconstructions.

11. The method of claim 1 wherein reconstructing comprises reconstructing with the machine-learned network including a feature extraction block comprising one or more convolution layers, the feature extraction block being prior to the iterative hierarchal convolutional networks, the feature extraction block having channels for receiving the concatenated first image with the auxiliary scan and/or map as the input.

12. The method of claim 1 wherein each of the iterative convolutional networks includes both down-sampling and up-sampling, wherein the iterative hierarchal convolutional networks have different weights, wherein the machine-learned network further comprises a memory network with convolution layers, the memory network applied separately to the outputs of the iterative hierarchal convolutional networks, with the machine-learned network further comprising an enhancement block of one or more convolutional layers, the enhancement block receiving a concatenation of outputs of the memory network and outputting the medical image as regularized.

13. A method for reconstruction of a magnetic resonance (MR) image in a MR imaging system, the method comprising:
   scanning, by the MR imaging system, a patient, the scanning resulting in k-space measurements;
   obtaining an auxiliary scan and/or map;
   reconstructing, by an image processor, the MR image from the k-space measurements, the reconstructing implemented, at least in part, with a machine-learned network, the machine-learned network including input of the auxiliary scan and/or map in the reconstructing; and
   displaying the MR image.

14. The method of claim 13 wherein the auxiliary scan and/or map comprises an external reference scan or a noise map.

15. The method of claim 13 wherein the input is formed as a concatenation of the auxiliary scan and/or map and a complex image output by a consistency stage, the machine-learned network being part of a regularization stage.

16. The method of claim 13 wherein the machine-learned network comprises iterative hierarchal convolutional networks.

17. A system for reconstruction in medical imaging, the system comprising:
   a medical scanner configured to scan a region of a patient, the scan providing scan data;
   an image processor configured to reconstruct a representation of the region from the scan data, the image processor configured to reconstruct by application of a machine-learned model in a regularization stage, the machine-learned model configured to receive an input image from a data consistency stage and auxiliary information; and
   a display configured to display a medical image of the region from the reconstructed representation.

18. The system of claim 17 further comprising a concatenation layer of the machine-learned model in the regularization stage, the concatenation layer configured to combine the auxiliary information and the input image.

19. The system of claim 17 wherein the auxiliary information comprises an external reference scan and/or a noise map.

20. The system of claim 17 wherein the machine-learned model comprises a down-sampling and up-sampling first block having multiple down-sampling and up-sampling second blocks.

* * * * *